United States Patent
Lin et al.

(10) Patent No.: US 7,151,561 B2
(45) Date of Patent: Dec. 19, 2006

(54) METHOD FOR DETECTING MOVEMENT OF IMAGE SENSORS

(75) Inventors: Chun-Huang Lin, Hsinchu (TW); Jeng-Feng Lan, Hsinchu (TW); Chien-Chang Huang, Hsinchu (TW)

(73) Assignee: PixArt Imaging Inc, Hsin-Chu (TW)

( * ) Notice: Subject to any disclaimer, the term of this patent is extended or adjusted under 35 U.S.C. 154(b) by 948 days.

(21) Appl. No.: 10/102,175

(22) Filed: Mar. 20, 2002

(65) Prior Publication Data

US 2004/0201705 A1 Oct. 14, 2004

(30) Foreign Application Priority Data

Sep. 11, 2001 (TW) ............... 90122445 A

(51) Int. Cl.
- H04N 5/228 (2006.01)
- G09G 5/08 (2006.01)
- G06K 9/56 (2006.01)
- G06K 9/64 (2006.01)

(52) U.S. Cl. ............... 348/208.1; 345/166; 382/205; 382/278

(58) Field of Classification Search ............... 348/154, 348/155, 171, 172, 208.14, 416.1, 699, 700, 348/208.1; 345/166; 382/195, 205, 206, 382/221, 218, 278, 107; 396/153; 250/559.32
See application file for complete search history.

(56) References Cited

U.S. PATENT DOCUMENTS

| | | | | |
|---|---|---|---|---|
| 4,521,773 A | * | 6/1985 | Lyon | 345/166 |
| 4,794,384 A | * | 12/1988 | Jackson | 345/166 |
| 4,937,666 A | * | 6/1990 | Yang | 348/413.1 |
| 5,107,293 A | * | 4/1992 | Sekine et al. | 348/208.99 |
| 5,563,652 A | * | 10/1996 | Toba et al. | 348/208.1 |
| 5,661,524 A | * | 8/1997 | Murdock et al. | 348/699 |
| 5,729,008 A | * | 3/1998 | Blalock et al. | 250/208.1 |
| 5,734,933 A | * | 3/1998 | Sekine et al. | 348/208.14 |
| 5,838,828 A | * | 11/1998 | Mizuki et al. | 382/107 |
| 5,930,405 A | * | 7/1999 | Chida | 382/284 |
| 6,172,354 B1 | * | 1/2001 | Adan et al. | 250/221 |
| 6,222,174 B1 | * | 4/2001 | Tullis et al. | 250/208.1 |
| 6,281,882 B1 | * | 8/2001 | Gordon et al. | 345/166 |
| 6,664,948 B1 | * | 12/2003 | Crane et al. | 345/166 |
| 6,809,758 B1 | * | 10/2004 | Jones | 348/208.99 |
| 6,859,199 B1 | * | 2/2005 | Shi | 345/166 |
| 7,057,148 B1 | * | 6/2006 | Wang | 345/166 |
| 7,079,116 B1 | * | 7/2006 | Park et al. | 345/166 |
| 7,085,418 B1 | * | 8/2006 | Kaneko et al. | 382/219 |

(Continued)

FOREIGN PATENT DOCUMENTS

WO          WO 9843436 A1   *   10/1998

*Primary Examiner*—John M. Villecco
(74) *Attorney, Agent, or Firm*—Tung & Associates

(57) ABSTRACT

A method to detect the movement of an image sensor according to captured images. An image region is captured from a first image. Then, a first corresponding region matching the first region is captured from a second image. A second image region is captured from the second image. Then, a second corresponding region matching the second captured image region is captured from the first image. Finally, the movement of the image sensor is determined according to the first region and the first corresponding region when a first relative distance between the first region and the first corresponding region is the same as a second relative distance of the second captured image region and the second corresponding region, but in the opposite direction.

3 Claims, 2 Drawing Sheets

U.S. PATENT DOCUMENTS

2003/0081129 A1* 5/2003 Lin et al. ................. 348/208.6
2005/0151724 A1* 7/2005 Lin et al. .................... 345/166

* cited by examiner

METHOD FOR DETECTING MOVEMENT OF IMAGE SENSORS

This application claims priority from Taiwanese application no. 90122445, filed in Taiwan, R.O.C., on Sep. 11, 2001, pursuant to 35 U.S.C. 119(a)–(d).

BACKGROUND OF THE INVENTION

1. Field of the Invention

The present invention relates in general to a method to detect the movement of an image sensor. In particular, the present invention relates to a method for detecting movement of an image sensor which, by comparing the images captured by the image sensor at different locations, finding the matched images and performing some verification processes, the movement of the image sensor is determined.

2. Description of the Related Art

Normally, the prior arts use block matching to determine the movement of an image sensor. Ideally, using this method can correctly find a matched frame block generated from the matching function, mean squared error (MSE) or mean absolute difference (MAD), then use the matched frame blocks to calculate the movement of the image sensor.

FIG. 1A and FIG. 1B show the conventional method to determine the movement of an image sensor by block matching. The frame 10A is the image captured by the image sensor in a first location, and the frame 10B is the image captured by the image sensor when the image sensor moves to a second location. Here, the size of the frame captured by the image sensor is 6×6 units, and the frame 10A is divided into 9 parts by 2×2 units. Then, the frame 10B is searched by block matching to find a frame block matching the frame block 12A in frame 10A.

However, there are actually many sources of noise, not only from image and process variation, but also from the environment of the image sensor such as temperature and illumination variation. Therefore, the matching result can only obtains a frame block 12B having a gray scale close to the frame block 12A, wherein the value of the matching function is the minimum. Then, a frame block 14B matching the frame block 14A is obtained from the image 10B by the same way.

In addition, the prior art has to compare all the frame blocks in the original images to determine the movement of the image sensor according to the frame 10A and 10B, that is, the conventional method has to fully search to get the result. Therefore, the conventional method requires using a large amount of data, so the determining rate is slow.

SUMMARY OF THE INVENTION

The object of the present invention is to provide a method to detect the movement of an image sensor. When comparing the original image and the following image, the present invention doesn't compare all the frame blocks in the original image with the following image. Rather, it selects a single frame block in the original image to fully search the following image. In addition, the present invention provides three verification methods to ensure the accuracy of the comparison. The three verification methods are cross checking, maximum error threshold, and determining the matched frame block number of the result of the comparison. The present invention quickly and accurately determines the movement of an image sensor using less data and operation.

To achieve the above-mentioned object, the present invention provides a method to detect the movement of an image sensor according to the captured images, including the following steps. An image region is captured from a first image. Then, a first corresponding region matching the first image region is captured from a second image. A second image region is captured from the second image. Then, a second corresponding region matching the second image region is captured from the first image. Finally, the movement of the image sensor is determined according to the first region and the first corresponding region when a first relative distance between the first region and the first corresponding region is the same as a second relative distance of the second captured image region and the second corresponding region, but in the opposite direction.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE PREFERRED EMBODIMENT

First Embodiment

Figure 1A:
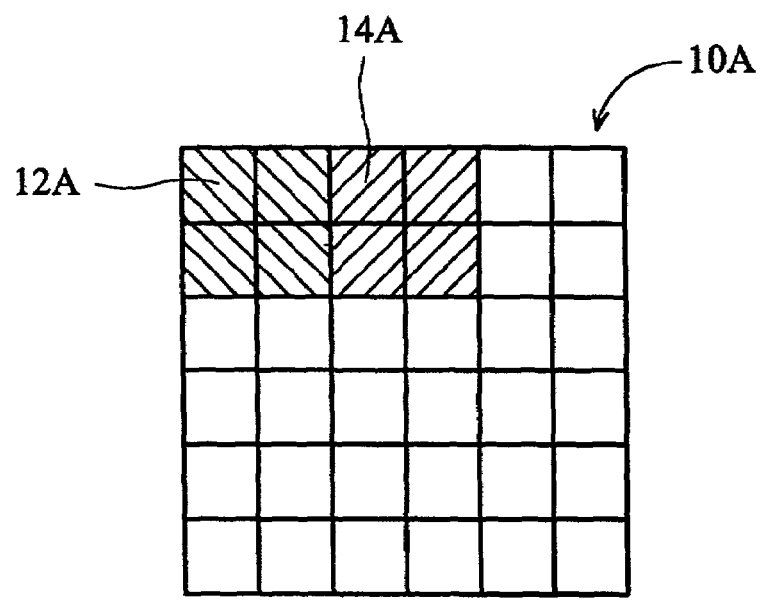
FIG. 1A and FIG. 1B show the conventional method to determine the movement of an image sensor by block matching.
Figure 1B:
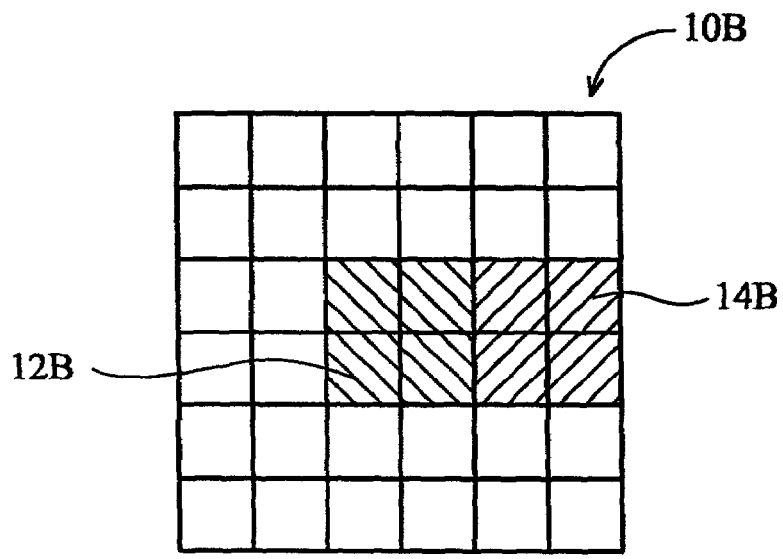
Figure 2A:
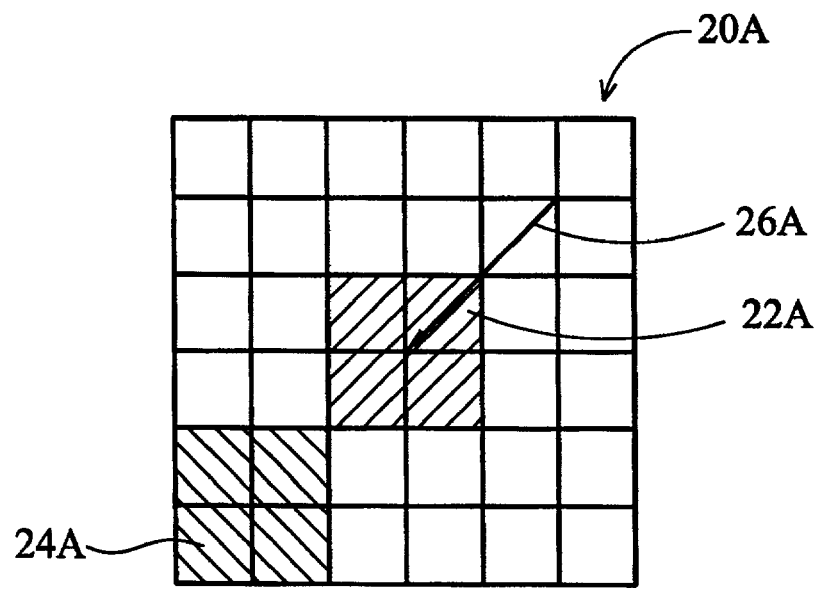
FIG. 2A and FIG. 2B show the method to determine the movement of an image sensor by block matching according to the embodiment of the present invention.
Figure 2B:
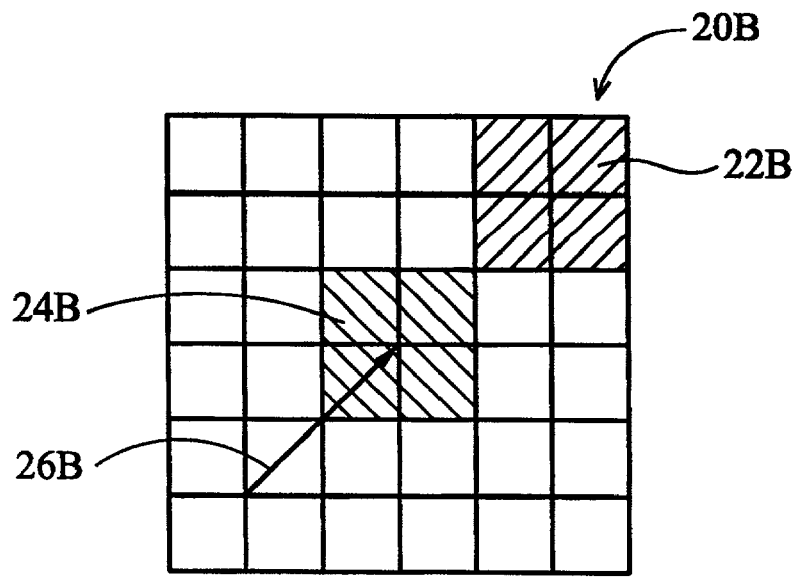

FIG. 2A and FIG. 2B show the method to determine the movement of an image sensor by block matching according to the embodiment of the present invention.

The first frame 20A is the image captured by the image sensor in a first location, and the second frame 20B is the image captured by the image sensor when the image sensor moves to a second location. Here, the size of the frame captured by the image sensor is 6×6 units. The frame block 22A is captured from the first frame 20A, wherein the size of the frame block 22A is 2×2 units. Then, frame block matching is performed to find the frame block 22B matching the frame block 22A in the second frame 20B, wherein the value of the matching function is the minimum. In addition, the frame block 22A is near the center of the first image 20A to avoid missing the matched frame block in the second image because the image sensor has moved too far.

Next, a verification process is performed, the present embodiment performing cross checking to verify the determination. The cross checking catches another frame block 24B from the center of the second image 20B and fully searches to find a matched frame block 24A in the first image 20A according to the frame block 24B, then calculates the dislocationment and moving direction of the frame blocks 22B and 22A (represented as the vector 26A) and the dislocationment and moving direction of the frame blocks 24B and 24A (represented as the vector 26B). The movement and moving direction of the image sensor are detected according to the frame blocks 22B and 22A when the vectors 26A and 26B have the same length and opposite directions.

Therefore, the movement and moving direction of the image sensor is detected with less data use.

Second Embodiment

FIG. 2A and FIG. 2B show the method to determine the movement of an image sensor by block matching according to the embodiment of the present invention.

The first frame 20A is the image captured by the image sensor in a first location, and the second frame 20B is the image captured by the image sensor when the image sensor moves to a second location. Here, the size of the frame captured by the image sensor is 6×6 units. The frame block 22A is captured from the first frame 20A, wherein the size of the frame block 22A is 2×2 units. Then, frame block matching is performed to find the frame block 22B matching the frame block 22A in the second frame 20B, wherein the value of the matching function is the minimum. In addition, the frame block 22A is near the center of the first image 20A to avoid missing the matched frame block in the second image because the image sensor has moved too far.

Next, a verification process is performed, the present embodiment performing the maximum error threshold method to verify the determination, which skips the search result when the value of the matching function by comparing the frame block 22B and frame block 22A is larger than a maximum error threshold value because the search result is wrong, which will cause errors in operation.

In this embodiment, if the image sensor has 6 bits resolution and 6×6 unit size, and assuming the tolerable noise is 10%, the maximum error threshold value is 6.4 ($2^6 \times 10\%$), which is definded by mean absolute difference.

Therefore, more correct movement and moving direction of the image sensor is detected.

Third Embodiment

FIG. 2A and FIG. 2B show the method to determine the movement of an image sensor by block matching according to the embodiment of the present invention.

The first frame 20A is the image captured by the image sensor in a first location, and the second frame 20B is the image captured by the image sensor when the image sensor moves to a second location. Here, the size of the frame captured by the image sensor is 6×6 units. The frame block 22A is captured from the first frame 20A, wherein the size of the frame block 22A is 2×2 units. Then, frame block matching is performed to find the frame block 22B matching the frame block 22A in the second frame 20B, wherein the value of the matching function is the minimum. In addition, the frame block 22A is near the center of the first image 20A to avoid missing the matched frame block in the second image because the image sensor has moved too far.

Next, a verification process is performed, the present embodiment ascertaining the result of the comparison by determining the number of the matched frame block. Therefore, if the number of the frame blocks in the second image 20B matching the frame block 22A is more than one, the search result is skipped because the search result is wrong, which will cause errors in operation.

Although embodiments of the present invention skip data which might be wrong, there is no influence on the whole determination result of the image sensor because the frame rate of the image sensor is very high, therefore, user viewability is not affected. As for an optical mouse, although skipping some wrong data causes mark stop, the mark goes to the correct location according to the next frame. However, if the mark of the optical mouse is moved according to the wrong data, the mark will go to the location unexpectly, which confuses the user operating the optical mouse.

Accordingly, the method according to the present invention employs capturing a part of frames and combining the verification methods mentioned above to obtain the movement of an image sensor, which decreases the data and simplifies the determination.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for detecting movement of an image sensor, during the movement of the image sensor, the image sensor capturing a first image at a first location and subsequently capturing a second image at a second location, the method comprising the following steps:

defining a first image region within the first image;

locating a first corresponding region corresponding to the first image region within the second image;

determining a first relative distance between the first image region and the first corresponding region;

defining a second image region within the second image;

locating a second corresponding region corresponding to the second image region within the first image;

determining a second relative distance between the second image region and the second corresponding region; and accumulating the movement of the image sensor according to the first relative and second relative distances.

2. The method for detecting movement of an image sensor as claimed in claim 1, wherein the first image region is substantially centered within the first image.

3. A method for detecting movement of an image sensor, during the movement of the image sensor, the image sensor capturing a first image at a first location and subsequently capturing a second image at a second location, the method comprising the following steps:

defining a first image region substantially centered within the first image;

comparing the first image region with more than one image region within the second image to locate a first corresponding region matching the first image region within the second image;

accumulating the movement of the image sensor according to the first image region and the first corresponding region;

determining a first relative distance between the first image region and the first corresponding region;

defining a second image region within the second image;

locating a second corresponding region corresponding to the second image region within the first image;

determining a second relative distance between the second image region and the second corresponding region; and accumulating the movement of the image sensor according to the first relative and second relative distances.

* * * * *